(12) United States Patent
Long et al.

(10) Patent No.: US 12,151,809 B2
(45) Date of Patent: Nov. 26, 2024

(54) POWER DISTRIBUTION CIRCUITS FOR ELECTRICALLY POWERED AIRCRAFT

(71) Applicant: Wisk Aero LLC, Mountain View, CA (US)

(72) Inventors: Geoffrey Alan Long, Montara, CA (US); Lewis Romeo Hom, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 478 days.

(21) Appl. No.: 17/202,855

(22) Filed: Mar. 16, 2021

(65) Prior Publication Data

US 2022/0127011 A1    Apr. 28, 2022

Related U.S. Application Data

(60) Provisional application No. 63/106,197, filed on Oct. 27, 2020.

(51) Int. Cl.

| | |
|---|---|
| H02P 1/00 | (2006.01) |
| B60L 3/00 | (2019.01) |
| B60L 50/60 | (2019.01) |
| B64C 29/00 | (2006.01) |
| B64D 27/24 | (2006.01) |

(Continued)

(52) U.S. Cl.
CPC ........ B64C 29/0033 (2013.01); B60L 3/0092 (2013.01); B60L 50/60 (2019.02); B64D 27/24 (2013.01); H02J 1/14 (2013.01); H02J 4/00 (2013.01); H02P 4/00 (2013.01); *B60L 2200/10* (2013.01); *H02J 2310/44* (2020.01)

(58) Field of Classification Search
CPC ...... H02P 4/00; H02J 1/14; H02J 4/00; B64D 27/24; B60L 50/60; B60L 3/0092; B60L 2200/10

See application file for complete search history.

(56) References Cited

U.S. PATENT DOCUMENTS

| | | | |
|---|---|---|---|
| 2,702,168 | A | 2/1955 | Platt |
| 4,504,029 | A | 3/1985 | Erickmann |

(Continued)

FOREIGN PATENT DOCUMENTS

| | | |
|---|---|---|
| CN | 111452981 A | 7/2020 |
| DE | 1406514 A1 | 10/1968 |

(Continued)

OTHER PUBLICATIONS

PCT/US2021/056667, "International Search Report and Written Opinion", Jan. 28, 2022, 10 pages.

(Continued)

*Primary Examiner* — Karen Masih
(74) *Attorney, Agent, or Firm* — Kilpatrick Townsend & Stockton LLP

(57) ABSTRACT

A power distribution circuit for an electrically powered aircraft includes a plurality of batteries and a plurality of electric propulsion systems. A plurality of isolated power distribution circuits each couple a battery of the plurality of batteries to two or more electric propulsion systems. The plurality of electric propulsion systems are positioned on the aircraft to apply balanced forces to the aircraft such that in the event of a failure, the aircraft remains stable and only experiences a loss in altitude or speed.

13 Claims, 10 Drawing Sheets

(51) Int. Cl.
*H02J 1/14* (2006.01)
*H02J 4/00* (2006.01)
*H02P 4/00* (2006.01)

(56) References Cited

U.S. PATENT DOCUMENTS

| | | |
|---|---|---|
| 5,195,702 A | 3/1993 | Malvestuto, Jr. |
| 6,247,667 B1 | 6/2001 | Fenny et al. |
| 6,415,242 B1 | 7/2002 | Weldon, Jr. et al. |
| 10,589,838 B1 | 3/2020 | Suppes |
| 2003/0094537 A1 | 5/2003 | Austen-Brown |
| 2004/0042145 A1 | 3/2004 | Garnett |
| 2008/0197961 A1 | 8/2008 | Patel |
| 2012/0234968 A1 | 9/2012 | Smith |
| 2015/0136897 A1 | 5/2015 | Seibel et al. |
| 2016/0083075 A1 | 3/2016 | Moxon |
| 2018/0312248 A1 | 11/2018 | Leng |
| 2020/0140079 A1 | 5/2020 | Campbell |
| 2020/0156780 A1 | 5/2020 | Varigas |
| 2020/0164975 A1 | 5/2020 | Robertson et al. |
| 2021/0206487 A1 | 7/2021 | Iqbal et al. |
| 2021/0300527 A1 | 9/2021 | Thalheimer |
| 2022/0009625 A1 | 1/2022 | Bower et al. |
| 2022/0024572 A1 | 1/2022 | Vanni et al. |

FOREIGN PATENT DOCUMENTS

| | | | |
|---|---|---|---|
| EP | 3466813 A1 | 4/2019 | |
| EP | 3647193 A1 * | 5/2020 | ............. B64C 27/28 |
| JP | 2002153027 A | 5/2002 | |
| JP | 2010220465 A | 9/2010 | |
| JP | 2018537348 A | 12/2018 | |
| KR | 20230093315 A * | 6/2023 | |
| WO | 2018203036 A1 | 11/2018 | |
| WO | 2020058706 A1 | 3/2020 | |

OTHER PUBLICATIONS

PCT/US2021/056891, "International Search Report and Written Opinion", Feb. 1, 2022, 9 pages.
PCT/US2021/056667, "International Preliminary Report on Patentability", May 11, 2023, 9 pages.
PCT/US2021/056891, "International Preliminary Report on Patentability", May 11, 2023, 8 pages.
U.S. Appl. No. 17/512,433, "Non-Final Office Action", Nov. 22, 2023, 11 pages.
U.S. Appl. No. 17/512,433, "Corrected Notice of Allowability", May 8, 2024, 2 pages.
U.S. Appl. No. 17/512,433, "Notice of Allowance", Feb. 20, 2024, 13 pages.
JP2023-524655, "Office Action", Apr. 2, 2024, 3 pages.
CA3195314, "Office Action", Sep. 19, 2024, 4 pages.
EP21887460.0, "Extended European Search Report", Sep. 16, 2024, 11 pages.
Finger et al., "A Review of Configuration Design for Distributed Propulsion Transitioning VTOL Aircraft", Asia-Pacific International Symposium on Aerospace Technology, Nov. 4, 2017, pp. 1-15.
PCT/US2024/039144, "Invitation to Pay Additional Fees and, Where Applicable, Protest Fee", Sep. 24, 2024, 2 pages.

* cited by examiner

POWER DISTRIBUTION CIRCUITS FOR ELECTRICALLY POWERED AIRCRAFT

CROSS-REFERENCES TO OTHER APPLICATIONS

This application claims priority to U.S. provisional patent application Ser. No. 63/106,197 "VTOL AIRCRAFT FAN TILTING MECHANISMS AND ARRANGEMENTS" filed on Oct. 27, 2020 which is hereby incorporated by reference in entirety for all purposes.

FIELD

The described embodiments relate generally to a power distribution system for rechargeable electric vehicles. More particularly, the present embodiments relate to a plurality of isolated power distribution circuits that enable redundant power distribution to balanced propulsion systems for electrically powered aircraft.

BACKGROUND

Electrically powered aircraft employ a plurality of propulsion systems powered by a two or more batteries for reliability and maneuverability. New power distribution circuits are needed that enable improved redundancy and aircraft stability in the case of various types of failure events.

SUMMARY

In some embodiments a power distribution circuit for an electrically powered aircraft is disclosed that includes a plurality of batteries and a plurality of electric propulsion systems. The power distribution circuit also includes a plurality of isolated power distribution circuits, each coupling a battery of the plurality of batteries to two or more electric propulsion systems of the plurality of electric propulsion systems, the two or more electric propulsion systems positioned on the aircraft to apply balanced forces to the aircraft. In various embodiments the balanced forces are balanced with respect to a center of gravity (cg) of the aircraft.

In some embodiments the two or more electric propulsion systems include two electric propulsion systems that are diametrically opposed from one another with respect to a center of gravity (cg) of the aircraft. In various embodiments the two or more electric propulsion systems include four electric propulsion systems that are arranged to apply forces to the aircraft that are balanced with respect to a center of gravity (cg) of the aircraft. In some embodiments the power distribution circuit further includes a plurality of contactors, each contactor coupled between each respective battery and each respective isolated power distribution circuit. In various embodiments at least one electric propulsion system of the plurality of electric propulsion systems includes a primary controller coupled to a primary winding and a redundant controller coupled to a redundant winding.

In some embodiments a first battery of the plurality of batteries is electrically coupled to a primary controller of a first propulsion system and where a second battery of the plurality of batteries is electrically coupled to a redundant controller of the first propulsion system. In various embodiments the power distribution circuit further includes a plurality of fuses, each fuse coupling two isolated power distribution circuits of the plurality of isolated power distribution circuits together such that the plurality of isolated power distribution circuits are electrically coupled together.

In some embodiments a power distribution circuit for an electrically powered includes a first and a second battery. A first electric propulsion system generates a first force and a second electric propulsion system generates a second force, where the first and the second forces are balanced with respect to a center of gravity of the aircraft. The power distribution circuit also includes a third electric propulsion system that generates a third force and a fourth electric propulsion system that generates a fourth force, where the third and the fourth forces are balanced with respect to the center of gravity of the aircraft. A first isolated power distribution circuit couples the first battery to the first and the second electric propulsion systems. The power distribution circuit also includes a second isolated power distribution circuit coupling the second battery to the third and the fourth electric propulsion systems.

In some embodiments the first electric propulsion system is attached to a first wing of the aircraft and the second electric propulsion system is attached to a second wing of the aircraft. In various embodiments the third electric propulsion system is attached to the first wing of the aircraft and the fourth electric propulsion system is attached to the second wing of the aircraft. In some embodiments the first and the second isolated power distribution circuits are primary isolated power distribution circuits, the power distribution circuit further including: a first redundant isolated power distribution circuit coupling a third battery to the first and the second electric propulsion systems; and a second redundant isolated power distribution circuit coupling a fourth battery to the third and the fourth electric propulsion systems.

In some embodiments the first and the second isolated power distribution circuits are coupled to a primary controller of the first electric propulsion system and to a primary controller of the second electric propulsion system, respectively; and where the first and the second redundant isolated power distribution circuits are coupled to a redundant controller of the first electric propulsion system and to a redundant controller of the second electric propulsion system, respectively. In some embodiments at least one electric propulsion system of the first, second, third and fourth electric propulsion systems includes a primary controller coupled to a primary winding and a redundant controller coupled to a redundant winding. In various embodiments the power distribution circuit further includes a fuse coupling the first isolated power distribution circuit to the second isolated power distribution circuit.

In some embodiments a method of powering an aircraft includes providing electrical power to first and second electric propulsion systems via a first isolated power distribution circuit coupled to a first battery, where the first electric propulsion system is attached to a left wing of the aircraft and the second electric propulsion system is attached to a right wing of the aircraft such that the first and second electric propulsion systems apply respective forces that are balanced about a center of gravity of the aircraft. In various embodiments the method of powering also includes providing electrical power to third and fourth electric propulsion systems via a second isolated power distribution circuit coupled to a second battery, where the third electric propulsion system is attached to a left wing of the aircraft and the fourth electric propulsion system is attached to a right wing of the aircraft such that the third and fourth electric propulsion systems apply respective forces that are balanced about a center of gravity of the aircraft.

In some embodiments the first and the second isolated power distribution circuits are primary isolated power distribution circuits, the method further including: providing electrical power to the first and the second electric propulsion systems via a first redundant isolated power distribution circuit coupled to a third battery; and providing electrical power to the third and the fourth electric propulsion systems via a second redundant isolated power distribution circuit coupled to a fourth battery. In various embodiments the method further includes a plurality of contactors, each contactor coupled between each respective battery and each respective isolated power distribution circuit. In some embodiments at least one of the first, second, third and fourth electric propulsion systems include a primary controller coupled to a primary winding and a redundant controller coupled to a redundant winding. In various embodiments the method further includes a fuse coupling the first isolated power distribution circuit to the second isolated power distribution circuit.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Techniques disclosed herein relate generally to an electrically powered aircraft including a plurality of tilting electric propulsion systems. More specifically, techniques disclosed herein provide a power distribution system including a plurality of isolated power distribution circuits that are coupled to separate batteries via contactors. Each power distribution circuit supplies power to a plurality of balanced electric propulsion systems so a power system failure results in a stable change in speed or altitude of the aircraft, but no rotation. Various inventive embodiments are described herein, including methods, processes, systems, devices, and the like.

In order to better appreciate the features and aspects of the power distribution systems for electrically powered aircraft according to the present disclosure, further context for the disclosure is provided in the following section by discussing particular implementations of an electrically powered vertical takeoff and landing (VTOL) aircraft according to embodiments of the present disclosure. These embodiments are for example only and power distribution systems can be employed in other types of electrically powered vehicles than those depicted herein.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1A:
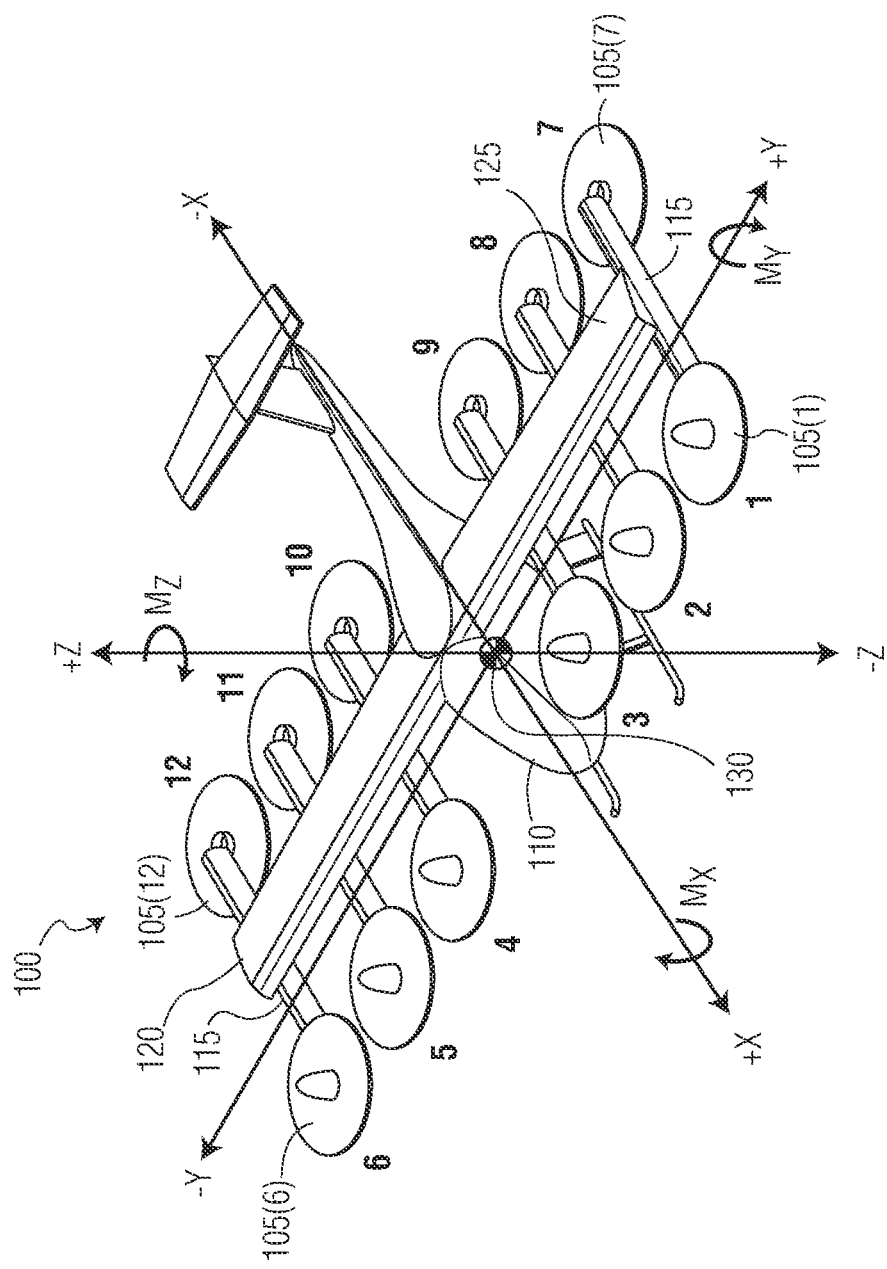
FIGS. 1A and 1B are simplified isometric views of an electrically powered aircraft in vertical (FIG. 1A) and horizontal (FIG. 1B) flight configuration according to an embodiment of the disclosure.
Figure 1B:
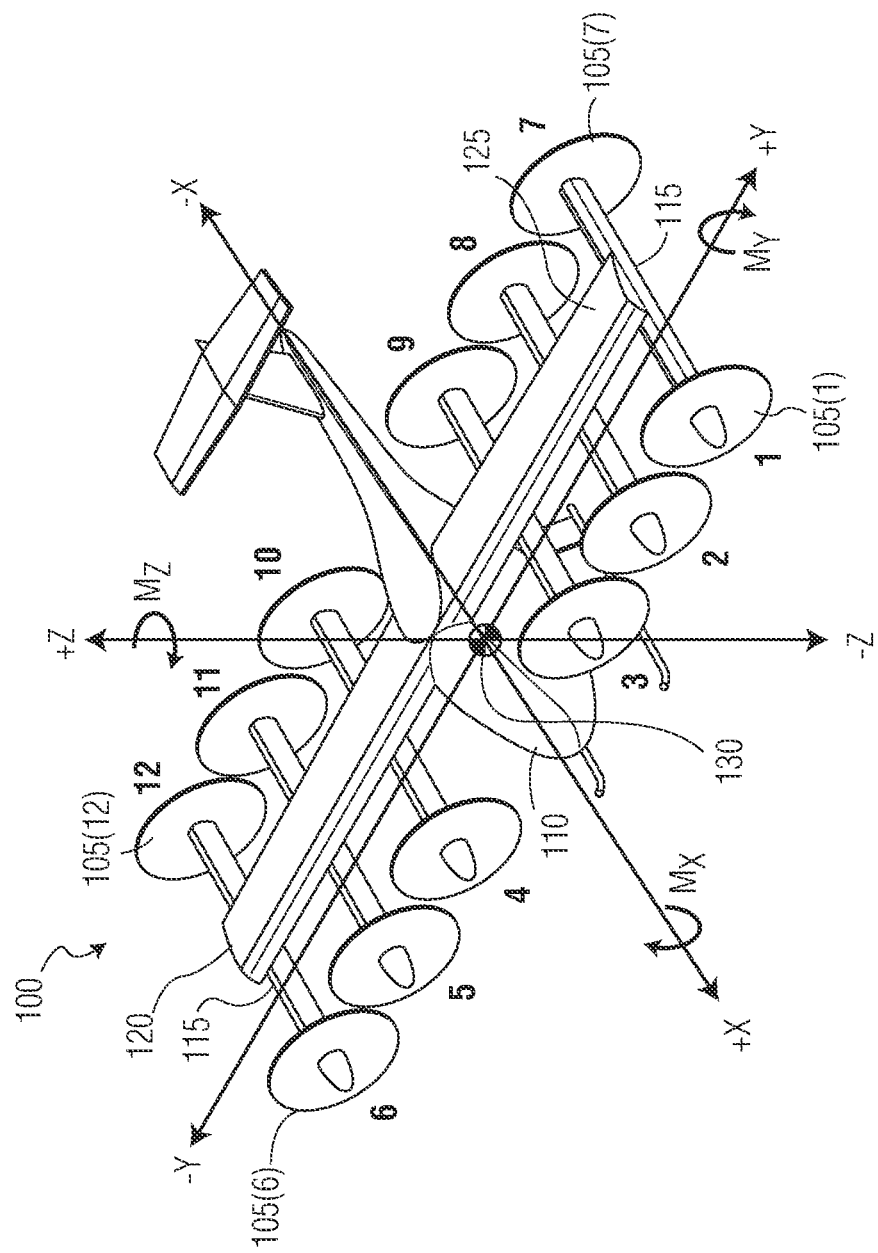

FIGS. 1A and 1B depict simplified isometric drawings of an electrically powered VTOL aircraft 100 with twelve tilting electronic propulsion systems 105(1)-105(12), according to embodiments of the disclosure. More specifically, FIG. 1A depicts aircraft 100 in a vertical flight configuration and FIG. 1B depicts aircraft 100 in a horizontal flight configuration.

As shown in FIGS. 1A and 1B, in some embodiments, aircraft 100 may be configured to carry one or more passengers and/or cargo, and may be controlled automatically and/or remotely (e.g. may not require an on-board pilot to operate the aircraft). In the example shown, aircraft 100 includes a fuselage 110 that may include a cabin section for carrying passengers and/or cargo. Propulsion systems 105(1)-105(12) may be mounted on opposite ends of booms 115. One or more booms 115 may be coupled to each wing 120, 125 of the aircraft 100 to enable aircraft 100 to have any number of propulsion systems 105. For example, each wing 120, 125 may include three booms 115, with each boom including a pair of tilting electronic propulsion systems 105 mounted thereon.

Aircraft 100 is illustrated in FIGS. 1A and 1B using three mutually perpendicular coordinate axes X, Y and Z, at the intersection of which is the aircraft center of gravity (CG) 130. Aircraft 100 has six degrees of freedom including forces in each coordinate axis direction Fx, Fy, Fz and moments about each coordinate axis Mx, My, Mz. Aircraft 100 includes a left wing 125 opposite a right wing 120 which are both attached to fuselage 110. In this embodiment propulsion systems 105 are distributed along each wing 120, 125 with an equal number on left wing 125, an equal number on right wing 120, an equal number in front of each wing and an equal number behind each wing. The equal distribution of propulsion systems 105 about CG 130 of aircraft 100 enables straight and level flight by applying equal power to each propulsion system due to all forces applied by each propulsion system being balanced about the CG. Of course, changes in applied forces and moments can be controlled by changing power supplied to one or more of propulsion systems 105.

Aircraft 100 includes a power distribution system (not shown in FIGS. 1A and 1B) that delivers power from a plurality of batteries to each propulsion system 105, as described in more detail below. In one embodiment, each power distribution circuit includes at least two propulsion systems 105 that are balanced about CG 130 so that if the power distribution circuit fails, the forces applied to the aircraft from the propulsion systems are balanced about the CG. For example propulsion systems 105(1) and 105(12) may be on one power distribution circuit and propulsion systems 105(6) and 105(7) may be on a different power distribution circuit.

If either power distribution circuit fails, for example in the configuration shown in FIG. 1A, aircraft 100 will only experience a change in force along the Z axis (Fz) and there will be no change in other forces or moments (Fx, Fy, Mx, My or Mz) so the aircraft will at most change altitude but will not pitch or roll. Other examples of balanced propulsion systems are 2, 11; 5, 8; 3, 10; 4, 9; 1, 6, 7, 12; 2, 5, 8, 11 and 3, 4, 9, 10 in addition to others. One of ordinary skill the art will appreciate that the number and location of the electronic propulsion systems 105 is not limited to that illustrated in FIGS. 1A-1B and that an aircraft can include less or more propulsion systems, provided at other positions on the aircraft, etc.

Figure 2:
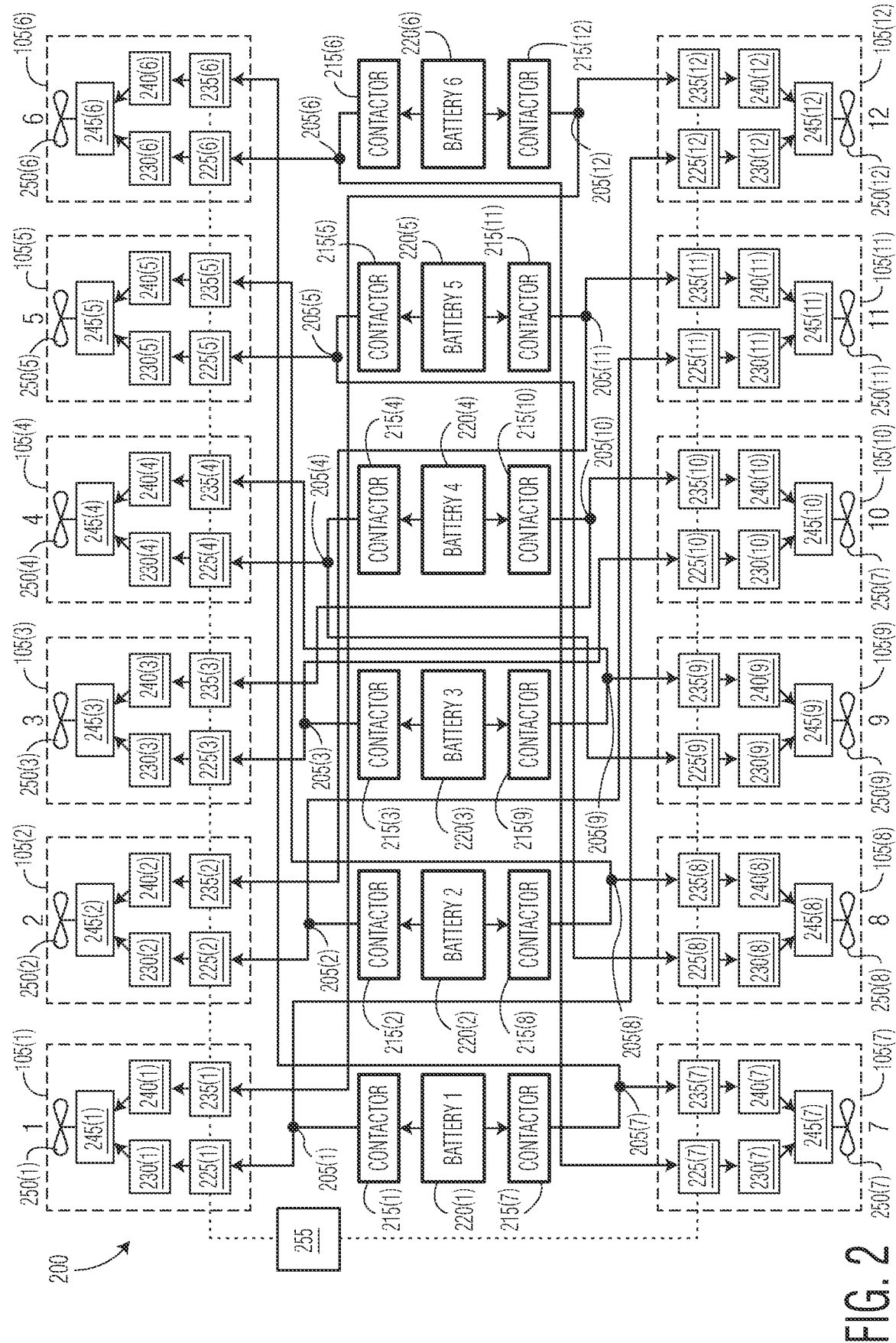
FIG. 2 is a simplified schematic of a power distribution system including six isolated primary power distribution circuits and six isolated redundant power distribution circuits for the electronically powered aircraft shown in FIGS. 1A and 1B.

FIG. 2 illustrates a simplified power distribution system 200 for aircraft 100 illustrated in FIGS. 1A and 1B. As shown in FIG. 2, power distribution system 200 includes twelve isolated power distribution circuits 205(1)-205(12), each coupled through a contactor 215(1)-215(12) to one of six batteries 220(1)-220(6) and arranged to supply power to two or more propulsion systems 105 that are balanced about CG 130 (see FIGS. 1A, 1B), as described in more detail below. More specifically, in this particular embodiment there are six primary isolated power distribution circuits 205(1)-205(6) and six redundant isolated power distribution circuits 205(7)-205(12). Each power distribution circuit 205 supplies power to a balanced pair of propulsion systems.

For example, primary power distribution circuit 205(1) is coupled to battery 1 220(1) through contactor 215(1) and supplies power to balanced propulsion systems 105(1) and 105(12). As shown in FIGS. 1A and 1B, propulsion systems 105(1) and 105(12) are balanced about CG 130 (see FIGS. 1A, 1B) because propulsion system 105(1) is the same distance along left wing 125 (e.g., +Y-axis) from CG 130 that propulsion system 105(12) is along right wing 120 from the CG, providing a balanced moment Mx about the X-axis. Further, propulsion system 105(1) is a same distance forward (along +X-axis) of CG 130 that propulsion system 105(12) is aft (along −X-axis) of the CG, providing a balanced moment My about the Y-axis. The balanced propulsion systems can also be called "diametrically opposed" with respect to CG 130. Thus, if battery 220(1) supplies increased or decreased power to power distribution circuit 205(1), aircraft 100 as shown in FIG. 1A will only raise or lower (e.g., change of force along Z-axis), but will not rotate about the X, Y or Z axes (in the flight configuration shown in FIG. 1).

In this particular embodiment each propulsion system 105 includes a primary controller 225(1)-225(12) coupled to a primary winding 230(1)-230(12) and a redundant controller 235(1)-235(12) coupled to a redundant winding 240(1)-240(12). Primary winding 230(1)-230(12) and redundant winding 240(1)-240(12) each couple power to a respective shaft 245(1)-245(12) that rotates a respective propeller 250(1)-250(12). Primary controller 225 and primary winding 230 are electrically isolated from redundant controller 235 and redundant winding 240 such that if one controller or winding fails, shaft 245 still receives ½ power from the other controller and winding.

For example, propulsion system 105(1) receives ½ power from battery 220(1) through primary power distribution circuit 205(1) that is coupled to primary controller 225(1) and primary winding 230(1) and receives ½ power from battery 220(6) through redundant power distribution circuit 205(12) that is coupled to redundant controller 235(1) and redundant winding 240(1). Thus, if battery 220(1) fails, propulsion system 105(1) still receives ½ power from battery 6 220(6). Since propulsion systems 105(1) and 105(12) are balanced, the power to each propulsion system is the same. In some embodiments a control or computing system 255 is used and can compensate and boost power supplied from battery 6 220(6) to propulsion systems 105(1) and 105(12) to compensate for the loss of ½ power due to a failure of battery 1 220(1).

In a like manner, battery 2 220(2) supplies power to propulsion systems 105(2) and 105(11) through primary power distribution circuit 205(2); battery 3 220(3) supplies power to propulsion systems 105(3) and 105(10) through primary power distribution circuit 205(3); battery 4 220(4) supplies power to propulsion systems 105(4) and 105(9) through primary power distribution circuit 205(4), battery 5 220(5) supplies power to propulsion systems 105(5) and 105(8) through primary power distribution circuit 205(5) and battery 6 220(6) supplies power to propulsion systems 105(6) and 105(7) through primary power distribution circuit 205(6).

In this embodiment there are also six redundant power distribution circuits 205(7)-205(12). Battery 1 220(1) supplies power to propulsion systems 105(6) and 105(7) through redundant power distribution circuit 205(7); battery 2 220(2) supplies power to propulsion systems 105(5) and 105(8) through redundant power distribution circuit 205(8); battery 3 220(3) supplies power to propulsion systems 105(4) and 105(9) through redundant power distribution circuit 205(9); battery 4 220(4) supplies power to propulsion systems 105(3) and 105(10) through redundant power distribution circuit 205(10); battery 5 220(5) supplies power to propulsion systems 105(2) and 105(11) through redundant power distribution circuit 205(5); battery 6 220(6) supplies power to propulsion systems 105(1) and 105(12) through redundant power distribution circuit 205(6). As appreciated by one of skill having the benefit of this disclosure other arrangements of primary and redundant power distribution circuits and propulsion systems are within the scope of this disclosure.

As shown in FIG. 2, each primary and redundant power distribution circuit 205 is coupled to a respective battery 220 via a respective contactor 215(1)-215(12). That is, each contactor 215 controls power supplied to a balanced pair of propulsion systems 105 via a respective power distribution circuit 205. In some embodiments each contactor 215 is an electromechanical relay while in other embodiments it can be a different device, including but not limited to one or more solid-state switches. In various embodiments contactor 215 can be controlled with a current sensing circuit that senses a current flowing into or out of the respective battery 220. When the current reaches a predetermined threshold, contactor 215 can open, breaking the connection between the battery 220 and the respective power distribution circuit 205. Each power distribution circuit 205 shown in FIG. 2 by a single line is representative of a DC circuit that includes at least a power and a ground conductor. In some embodiments a common ground conductor can be used for two or more power distribution circuits 205. In various embodiments contactors 215 can be positioned between only the positive or the ground conductor and battery 220 while in other embodiments they can be positioned between both the power and the ground conductors. In further embodiments fuses can be used in place of contactors 215 or in addition to contactors.

In some embodiments control system 255 can be coupled to controllers 225,235, contactors 215 and/or batteries 220 to control one or more functions of power distribution system 200, as described in more detail below. In one embodiment, control system 255 can make adjustments in one or more controllers 225, 235 to maintain batteries 220 at a similar charge state. More specifically, in some embodiments one or more batteries 220 may be aged (e.g., older or having experienced more discharge cycles) and have a reduced charge capacity and/or one or more batteries may be swapped for a freshly charged battery such that batteries have an unequal charge state. Control system 255 can receive information from each battery 220 related to its charge state and adjust power drawn from each battery by adjusting an operation of one or more controllers 225, 235.

In some embodiments each controller 225, 235 includes an inverter that receives DC power from power distribution circuit 205 and converts it to AC power that is supplied to motor windings 230, 240 in terms of torque, rpm, blade pitch angle, etc. In various embodiments each propulsion system 105 includes an AC motor, however in other embodiments it can include multiple motors coupled to a single shaft and in further embodiments can be a DC motor. In some embodiments, such as shown in FIGS. 1A and 1B, aircraft 100 is over-actuated, that is it has more propulsion systems 105 (e.g., 12) than degrees of freedom (e.g., 6) and therefore control system 255 can adjust myriad combinations of controllers 225, 235 to discharge a particular battery 220 faster or slower than others to maintain an equal charge state among all of the batteries. Thus, control system 255 can use forces and moments (e.g., Fx, Fy, Fz, Mx, My, Mz) and charge state of batteries 220 as inputs and can output commands to controllers 225, 235 to optimize charge state, and power usage.

In some embodiments the balanced arrangement of the propulsion systems 105 on aircraft 100 enables even discharge of batteries 220 during cross-winds and other conditions. For example, as shown in FIG. 1A a cross-wind approaching from the left (e.g., from propulsion systems 105(1), 105(7) towards propulsion systems 105(6), 105(12) causes power draw from propulsion systems 105(1) and 105(7) to reduce and power draw from propulsion systems 105(6) and 105(12) to increase. However, as shown in FIG. 2, propulsion systems 105(1) and 105(12) are coupled to the same batteries (e.g., batteries 220(1) and 220(6)) thus the increased power draw of 105(12) offsets the decreased power draw of 105(1), thus batteries 220(1) and 220(6) maintain a relatively similar rate of discharge as batteries 220(2)-220(5). Similarly, propulsion systems 105(6) and 105(7) are balanced.

In some embodiments one or more diodes can be coupled in-series with power distribution circuits such that current can only flow out of batteries and not into batteries to protect the power distribution system in case of a shorted battery. In other embodiments power distribution system enables regenerative charging in which propulsion systems generate energy (e.g., during descent) and transfer power to batteries.

Figure 3:
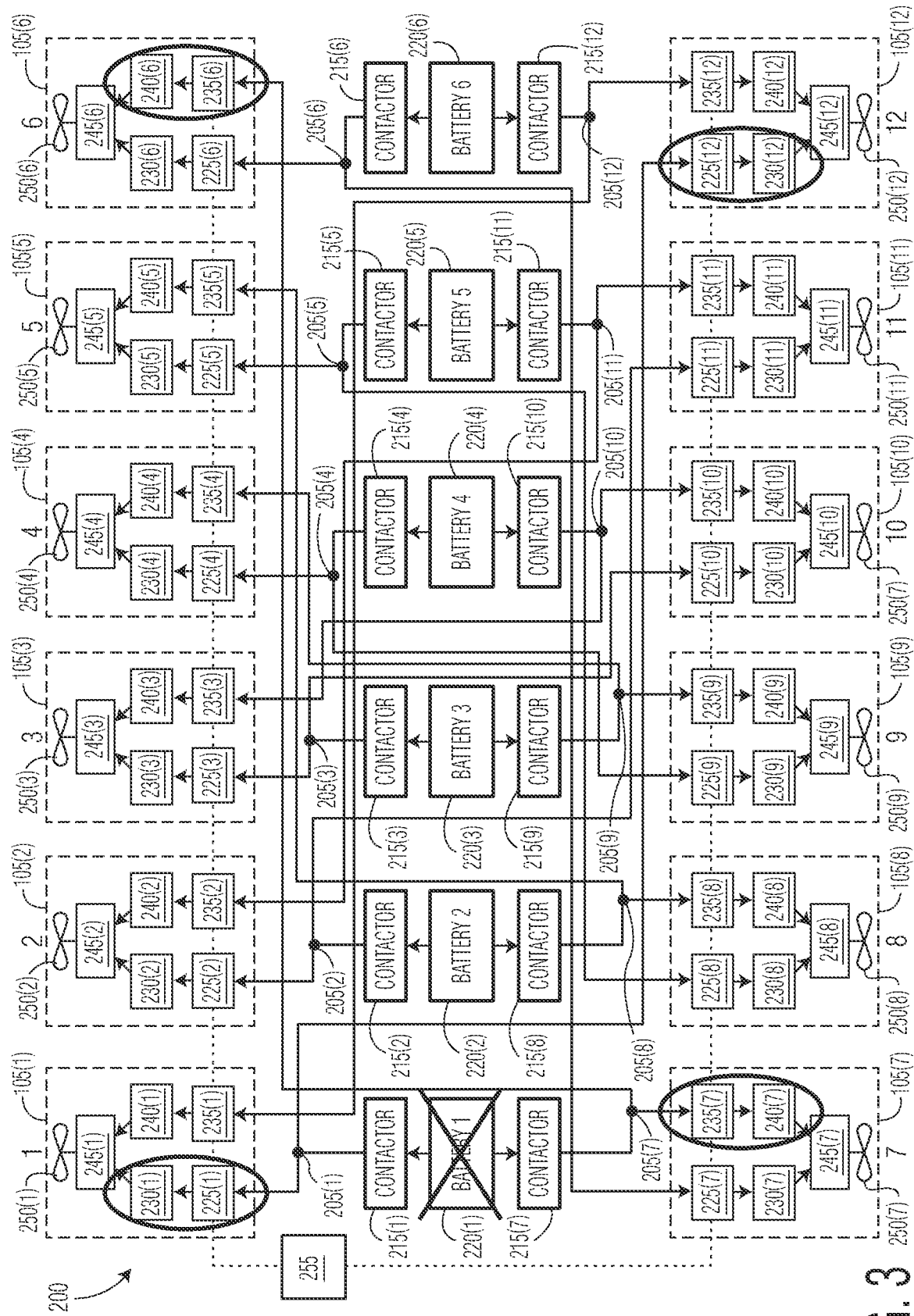
FIG. 3 is the schematic of the power distribution system shown in FIG. 2 showing the effect of a battery failure.

FIGS. 3-6 illustrate the operation of power distribution system 200 in the event of example failure modes. Other failure modes and responses to failure modes by power distribution system, although not shown, are within the scope of this disclosure. FIG. 3 illustrates the power distribution system 200 shown in FIG. 2, however in FIG. 3 battery 220(1) is shown as failed. As shown in FIG. 3, failed battery 220(1) causes contactor 215(1) and contactor 215(7) to open such that power is no longer supplied to propulsion system 105(1) via primary controller 225(1), to propulsion system 105(12) via primary controller 225(12) to propulsion system 105(6) via redundant controller 235(6) and to propulsion system 105(7) via redundant controller 235(7). Thus, propulsion systems 105(1), 105(6), 105(7) and 105 (12) receive ½ the power that they were receiving before battery 220(1) failure.

As described above, in some embodiments control system 255 can detect the failure, open contactors 215(1), 215(7) and immediately increase power to propulsion systems 105(1), 105(6), 105(7) and 105(12) from battery 220(6) to restore 100% power to the aircraft. Alternatively, because of the balanced nature of the power distribution circuits 205, control system 255 can increase power to propulsion systems 105(1) and 105(12) to compensate for the entire power loss from battery 220(1), or could alternatively increase power to propulsion systems 105(6) and 105(7). Alternatively, control system 255 could take more complex action and increase power from battery 220(2) to propulsion systems 105(2) and 105(11), for example, to compensate for the failure. One of skill in the art having the benefit of this disclosure will appreciate the many different options controller can use to compensate for the loss of battery 220(1).

Figure 4:
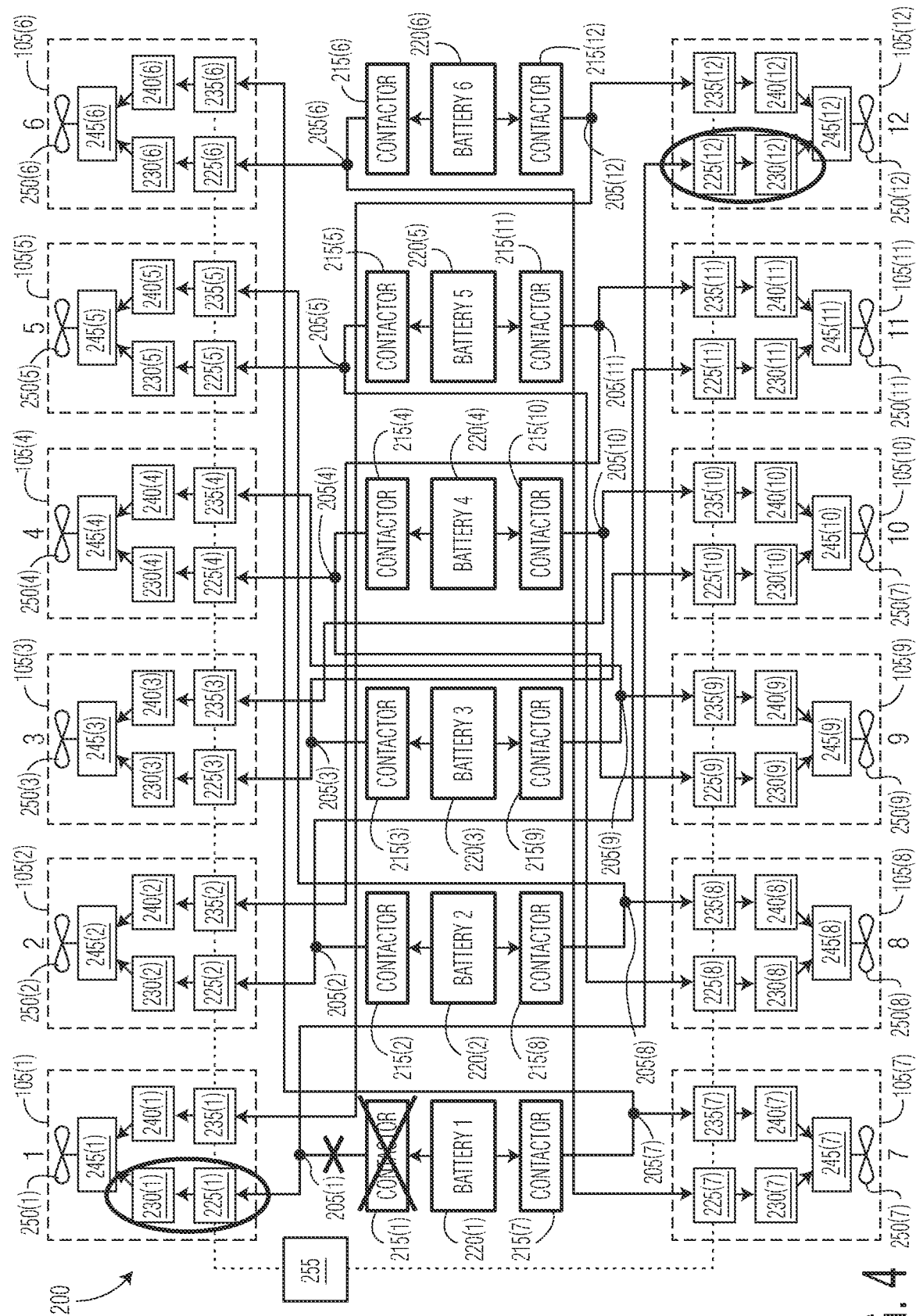
FIG. 4 is the schematic of the power distribution system shown in FIG. 2 showing the effect of a failure of a contactor or a short in the power distribution bus.

FIG. 4 illustrates power distribution system 200 shown in FIG. 2, however in FIG. 4 battery contactor 215(1) has failed and/or there is a short within power distribution circuit 205(1). As shown in FIG. 3, contactor 215(1) can be opened once the failure is detected which cuts off power from power distribution circuit 205(1) which supplies power to balanced propulsion systems 105(1) and 105(12). Thus power is reduced to aircraft 100 in a balanced matter. Because contactor 215(1) breaks the connection between the failure and battery 220(1), the battery can still supply power to power distribution circuit 205(7) and propulsion systems 105(6) and 105(7) via contactor 215(7).

Figure 5:
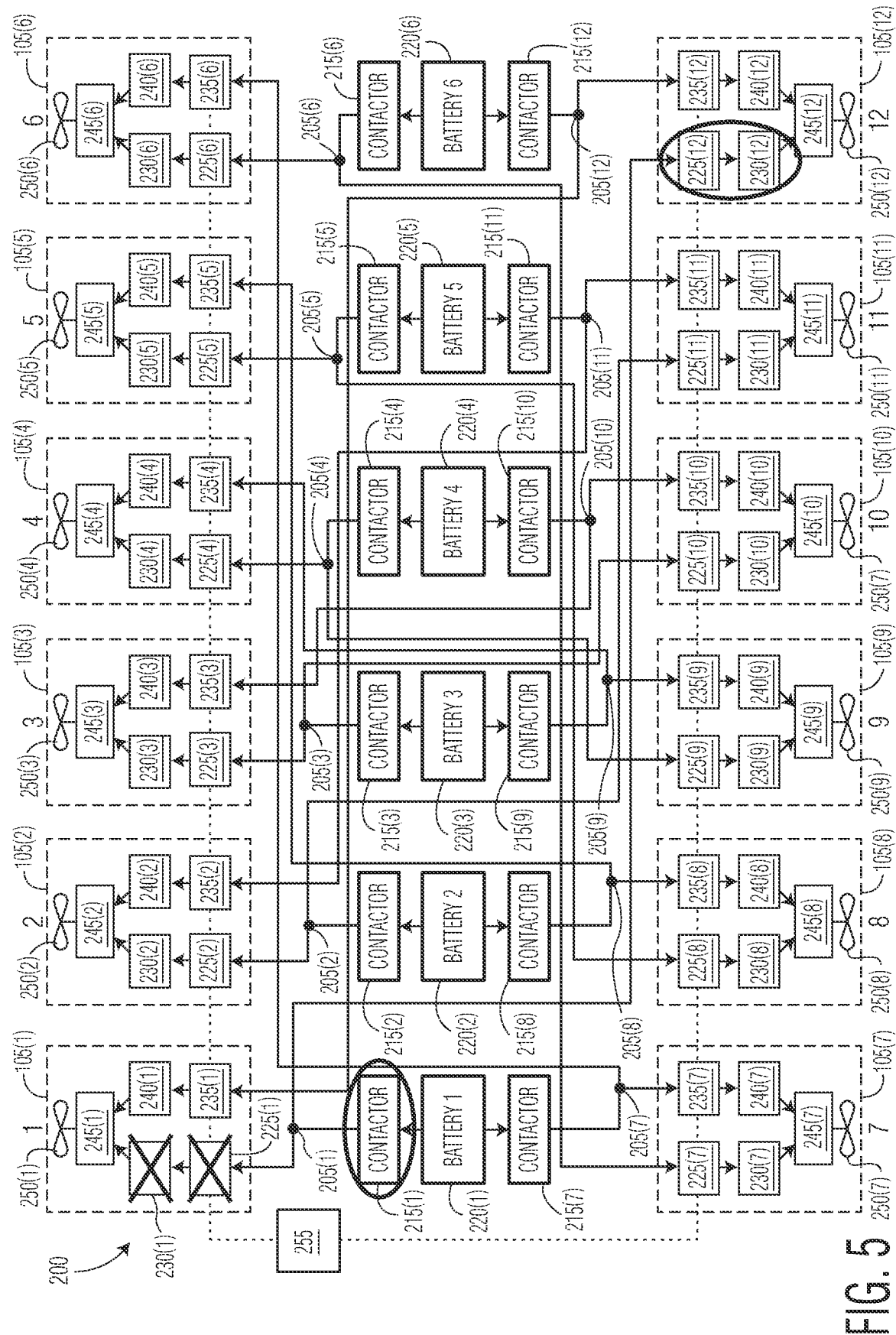
FIG. 5 is the schematic of the power distribution system shown in FIG. 2 showing the effect of a shorted inverter or motor winding.

FIG. 5 illustrates power distribution system 200 shown in FIG. 2, however in FIG. 5 primary controller 225(1) and/or primary winding 230(1) has failed. As shown in FIG. 5, contactor 215(1) can be opened once the failure is detected which cuts off power from power distribution circuit 205(1) and from battery 220(1) to primary controller 225(1) and primary winding 230(1). Propulsion system 105(1) can still receive ½ power from battery 220(6) via redundant power distribution circuit 205(12).

Figure 6:
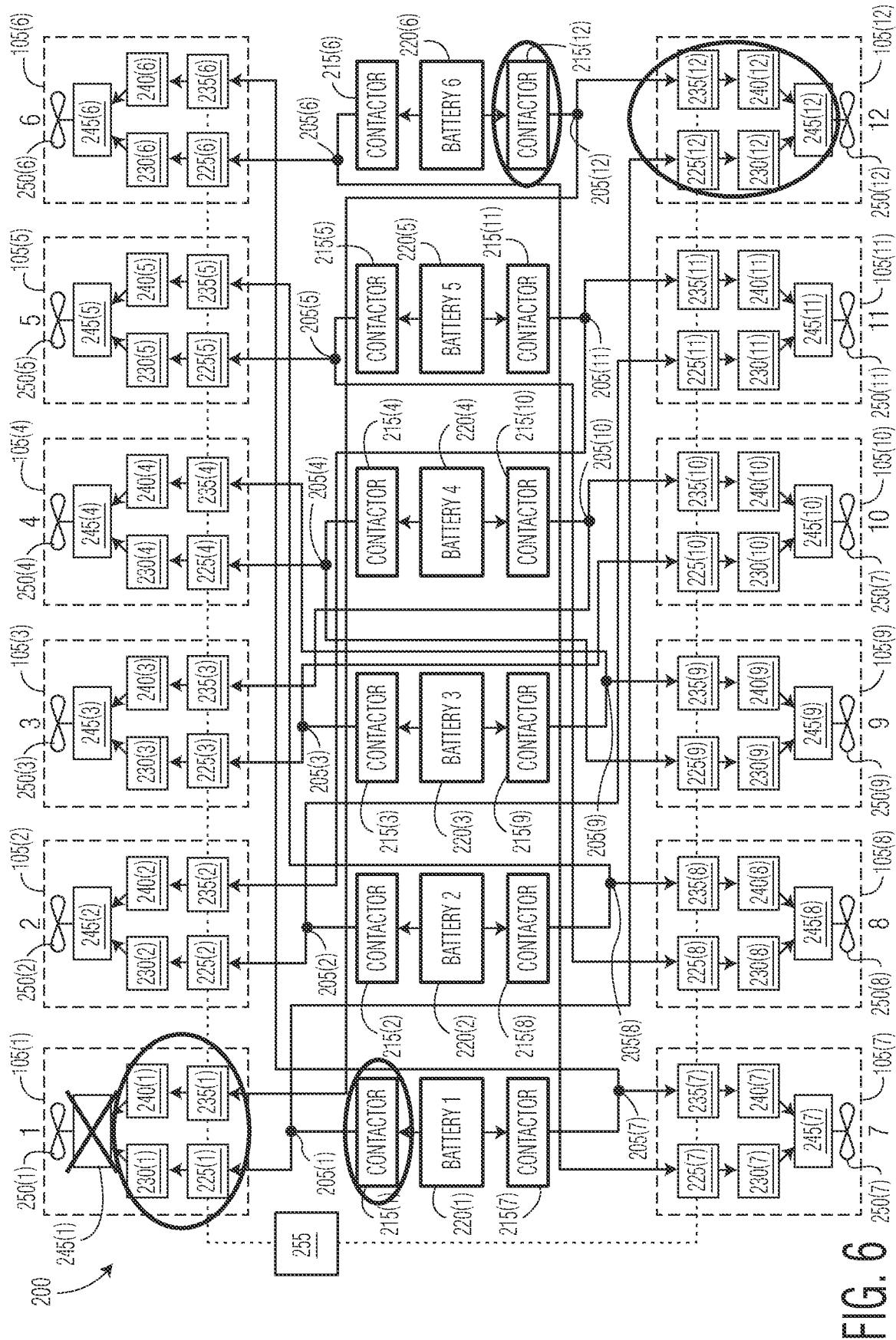
FIG. 6 is the schematic of the power distribution system shown in FIG. 2 showing the effect of a seized motor.

FIG. 6 illustrates power distribution system 200 shown in FIG. 2, however in FIG. 6 shaft 245(1) of first propulsion system 105(1) is seized. As shown in FIG. 6, contactor 215(1) can be opened once the failure is detected which cuts off power from power distribution circuit 205(1) and from battery 220(1). Similarly, contactor 215(12) can be opened which cuts off power from redundant power distribution circuit 205(12) and from battery 220(6). Because of the balanced arrangement, opening contactors 215(1), 215(12) also results in a complete loss of power delivered to propulsion system 105(12). Because the loss of power to propulsion systems 105(1) and 105(12) is balanced, aircraft 100 will not rotate in response to the failure and will only lose altitude or speed. Control system 255 can compensate for the failure in myriad ways, as described above.

Figure 7:
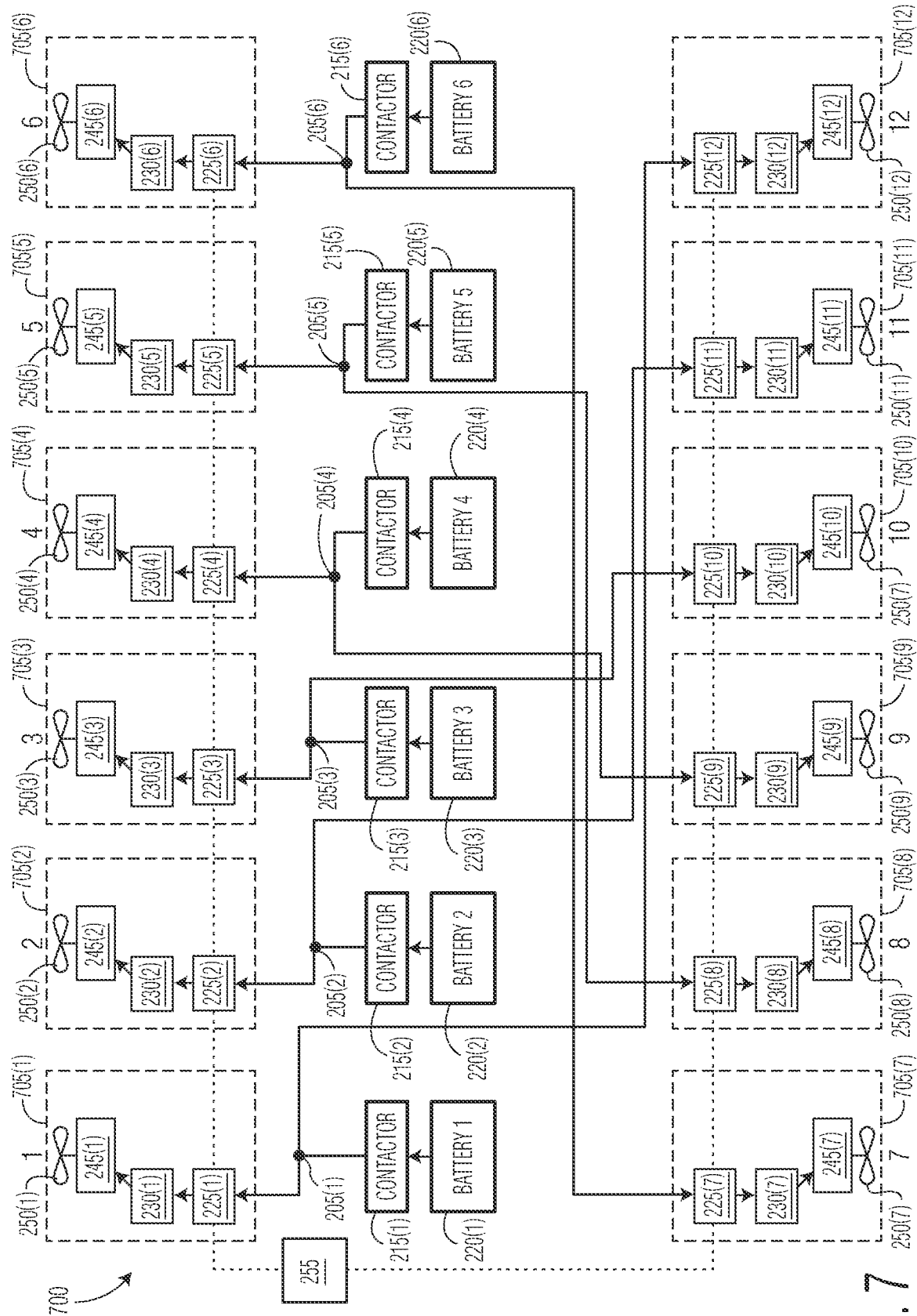
FIG. 7 is a simplified schematic of a power distribution system including six isolated primary power distribution circuits, and no redundant power distribution circuits, for the electronically powered aircraft shown in FIGS. 1A and 1B.

FIG. 7 illustrates a power distribution system 700 that is similar to power distribution system 200 shown in FIG. 2, however in FIG. 7 the redundant power distribution circuits 205(7)-205(12) have been removed. As shown in FIG. 7 each propulsion system 705(1)-705(12) has only a primary controller 225 and a primary winding 230. The primary power distribution circuits 205(1)-205(6) still supply power to propulsion systems 105 in a balanced matter. However, if a primary power distribution circuit 205(1)-205(6) fails there is no redundant power distribution circuit to continue to supply power to propulsion systems 705. For example, if battery 220(1) fails, contactor 215(1) opens and balanced propulsion systems 705(1) and 705(12) cease operation. Control system 255 can compensate by increasing power from battery 220(6) to balanced propulsion systems 705(6) and 705(7) or by taking myriad other actions.

Figure 8:
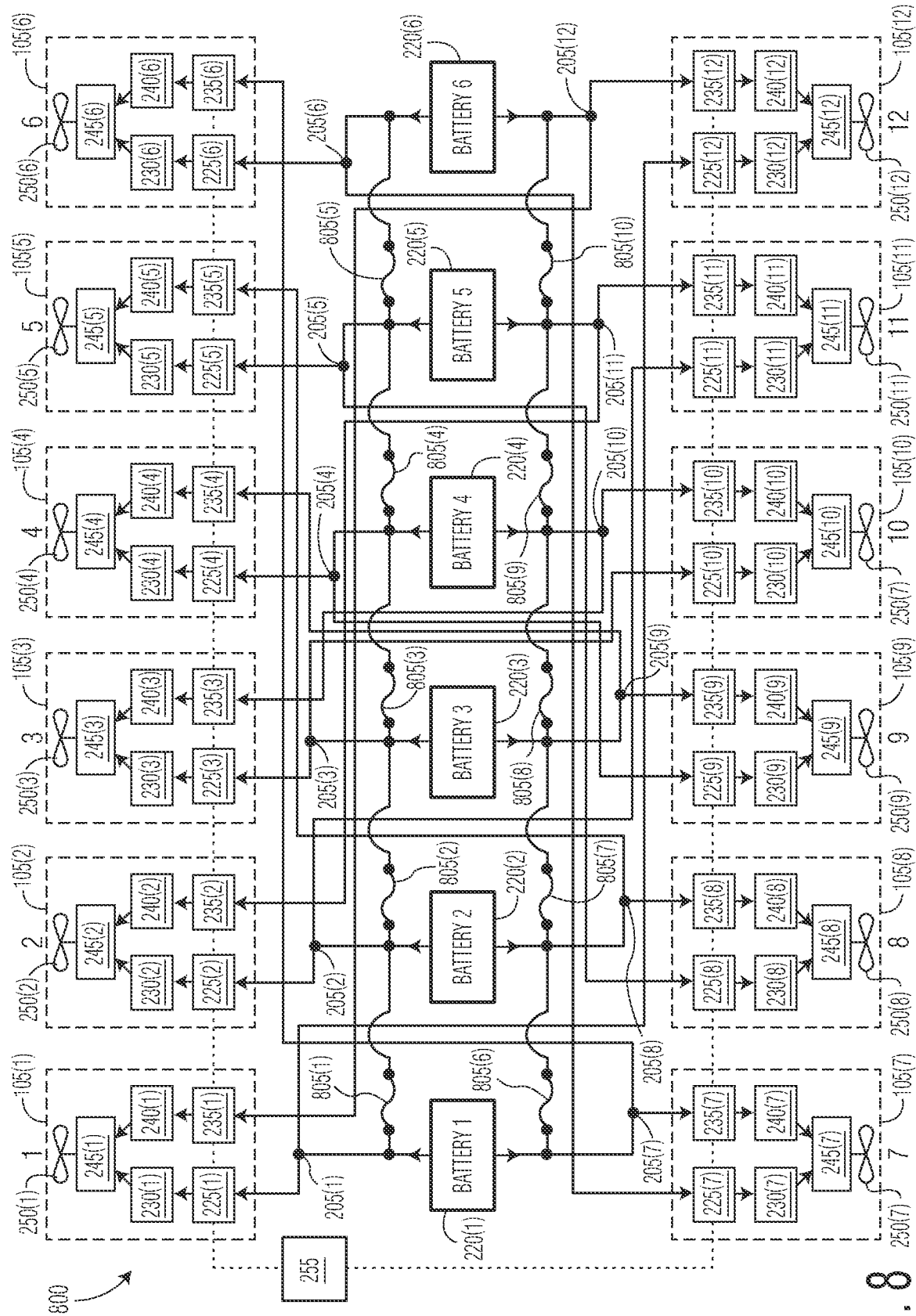
FIG. 8 is a simplified schematic of a power distribution system including six primary power distribution circuits and six redundant power distribution circuits coupled together via fuses to form a common power bus for the electronically powered aircraft shown in FIGS. 1A and 1B.

FIG. 8 illustrates a power distribution system 800 that is similar to power distribution system 200 shown in FIG. 2, however in FIG. 8 each primary power distribution circuit 205(1)-205(6) and each redundant power distribution circuit 205(7)-205(12) has been coupled together with a fuse 805(1)-805(10). As shown in FIG. 8 first fuse 805(1) couples first and second primary power distribution circuits, 205(1), 205(2), respectively, second fuse 805(2) couples second and third primary power distribution circuits 205(2), 205(3), respectively, and similar connections are made for third fuse through fifth fuse, 805(3)-805(5), respectively. Similarly, redundant power distribution circuits 205(7)-205(12) are coupled together with sixth fuse 805(6) that couples first and second redundant power distribution circuits 205(7), 205(8), respectively, seventh fuse 805(7) that couples second and third redundant power distribution circuits 205(8), 205(9), respectively, and similar connections are made for eighth fuse through tenth fuse, 805(8)-805(10), respectively.

Fuses 805 result in all power distribution circuits 205 having a common voltage level as they are all electrically coupled together. This arrangement enables the even discharge of batteries 220 and power sharing along the common bus. In the event of a shorted battery failure, e.g., battery 220(2), first fuse 805(1), second fuse 805(2), sixth fuse 805(6) and seventh fuse 805(7) blow, isolating first battery 220(1) from batteries 220(3)-220(6). Essentially, a failure causes the failed power distribution circuits to "island" as a result of the fuses on either side of the failure blowing. In some embodiments contactors can be included, as shown in FIG. 2 to decouple each battery from primary and/or redundant power distribution circuits.

Figure 9:
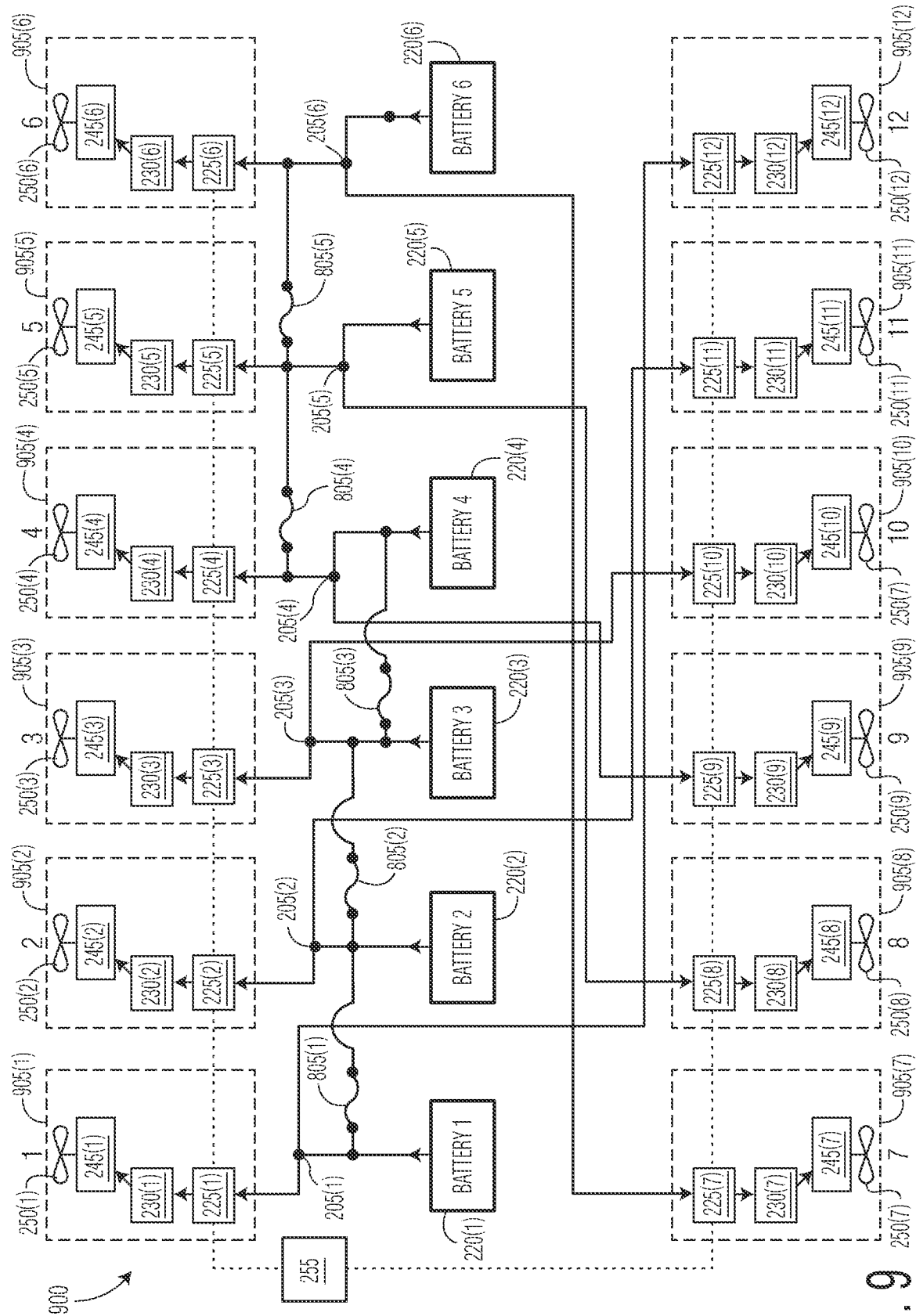
FIG. 9 is a simplified schematic of a power distribution system including six isolated primary power distribution circuits coupled together via fuse to form a common power bus, for the electronically powered aircraft shown in FIGS. 1A and 1B.

FIG. 9 illustrates a power distribution system 900 that is similar to power distribution system 800 shown in FIG. 8 and power distribution system 200 shown in FIG. 2, however in FIG. 9 the redundant power distribution circuits 205(7)-205(12) have been removed. As shown in FIG. 9 each propulsion system 905 has only a primary controller 225 and a primary winding 230. Primary power distribution circuits 205(1)-205(6) are each coupled together via fuses 805(1)-805(5) to form a common bus and supply power to propulsion systems 905 in a balanced matter. Fuses 805 result in all power distribution circuits 205 having a common voltage level as they are all electrically coupled together. This arrangement enables the even discharge of batteries 220 and power sharing along the common bus. Similar to FIG. 8, in the event of a failure, the failed power distribution circuits and/or battery is "islanded" through the blowing of one or more fuses on either side of the failure. In some embodiments contactors can be included, as shown in FIG. 2 to decouple each battery from primary and/or redundant power distribution circuits.

Although aircraft 100 (see FIG. 1) is described and illustrated as one particular configuration of aircraft, embodiments of the disclosure are suitable for use with a multiplicity of aircraft. For example, any aircraft that uses two or more electronic propulsion systems can be used with embodiments of the disclosure. In some instances, embodiments of the disclosure are particularly well suited for use with aircraft that carry one or more persons because of the need for reliability, however the power distribution system disclosed herein is not limited to "manned" aircraft and can be used on any aircraft "manned" and "unmanned" of any size.

For simplicity, various electrical components, such as capacitors, current sense circuits, controller details, processors communications busses, memory, storage devices and other components of the power distribution system are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

With reference to the appended figures, components that can include memory (e.g., control or computing system 255, controllers 225, 235, etc.) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. An electrically powered aircraft comprising:
   a plurality of batteries comprising a first battery and a second battery;
   a first electric propulsion assembly, a second electric propulsion assembly, a third electric propulsion assembly, and a fourth electric propulsion assembly, wherein the first electric propulsion assembly and the second electric propulsion assembly are disposed diametrically opposed and equal distant relative to a center of gravity of the aircraft, and wherein the third electric propulsion assembly and the fourth electric propulsion assembly are disposed diametrically opposed and equal distant relative to the center of gravity of the aircraft;
   a first power distribution system coupling the first battery with each of the first electric propulsion assembly and the second electric propulsion assembly and isolating the first battery from each of the third electric propulsion assembly and the fourth electric propulsion assembly; and
   a second power distribution system coupling the second battery with each of the third electric propulsion assembly and the fourth electric propulsion assembly and isolating the second battery from each of the first electric propulsion assembly and the second electric propulsion assembly.

2. The electrically powered aircraft of claim 1 further comprising:
   a first contactor coupled between the first battery and the first electric propulsion assembly and between the first battery and the second electric propulsion assembly; and
   a second contactor coupled between the second battery and the third electric propulsion assembly and between the second battery and the fourth electric propulsion assembly.

3. The electrically powered aircraft of claim 1, wherein at least one of:
   the first electric propulsion assembly comprises a first electric propulsion assembly propeller, a first electric propulsion assembly shaft configured for rotating the first electric propulsion assembly propeller, a first electric propulsion assembly primary winding configured for rotating the first electric propulsion assembly shaft, a first electric propulsion assembly primary controller configured for controlling delivery of electrical current from the first battery to the first electric propulsion assembly primary winding, a first electric propulsion assembly redundant winding configured for rotating the first electric propulsion assembly shaft, a first electric propulsion assembly redundant controller configured for controlling delivery of electrical current to the first electric propulsion assembly redundant winding from one of the plurality of batteries other than the first battery;
   the second electric propulsion assembly comprises a second electric propulsion assembly propeller, a second electric propulsion assembly shaft configured for rotating the second electric propulsion assembly propeller, a second electric propulsion assembly primary winding configured for rotating the second electric propulsion assembly shaft, a second electric propulsion assembly primary controller configured for controlling delivery of electrical current from the first battery to the second electric propulsion assembly primary winding, a second electric propulsion assembly redundant winding configured for rotating the second electric propulsion assembly shaft, a second electric propulsion assembly redundant controller configured for controlling delivery of electrical current to the second electric propulsion assembly redundant winding from one of the plurality of batteries other than the first battery;
   the third electric propulsion assembly comprises a third electric propulsion assembly propeller, a third electric propulsion assembly shaft configured for rotating the third electric propulsion assembly propeller, a third electric propulsion assembly primary winding configured for rotating the third electric propulsion assembly shaft, a third electric propulsion assembly primary controller configured for controlling delivery of electrical current from the second battery to the third electric propulsion assembly primary winding, a third electric propulsion assembly redundant winding configured for rotating the third electric propulsion assembly shaft, a third electric propulsion assembly redundant controller configured for controlling delivery of electrical current to the third electric propulsion assembly redundant winding from one of the plurality of batteries other than the second battery; or
   the fourth electric propulsion assembly comprises a fourth electric propulsion assembly propeller, a fourth electric propulsion assembly shaft configured for rotating the fourth electric propulsion assembly propeller, a fourth electric propulsion assembly primary winding configured for rotating the fourth electric propulsion assembly shaft, a fourth electric propulsion assembly primary controller configured for controlling delivery of electrical current from the second battery to the fourth electric propulsion assembly primary winding, a fourth electric propulsion assembly redundant winding configured for rotating the fourth electric propulsion assembly shaft, a fourth electric propulsion assembly redundant controller configured for controlling delivery of electrical current to the fourth electric propulsion assembly redundant winding from one of the plurality of batteries other than the second battery.

4. The electrically powered aircraft of claim 3, wherein at least one of:
   the first electric propulsion assembly redundant controller is configured for controlling delivery of electrical current to the first electric propulsion assembly redundant winding from the second battery;
   the second electric propulsion assembly redundant controller is configured for controlling delivery of electrical current to the second electric propulsion assembly redundant winding from the second battery;
   the third electric propulsion assembly redundant controller is configured for controlling delivery of electrical current to the third electric propulsion assembly redundant winding from the first battery; or
   the fourth electric propulsion assembly redundant controller is configured for controlling delivery of electrical current to the fourth electric propulsion assembly redundant winding from the first battery.

5. An electrically powered aircraft comprising:
a plurality of batteries comprising a first battery and a second battery;
a first electric propulsion assembly, a second electric propulsion assembly, a third electric propulsion assembly, and a fourth electric propulsion assembly, wherein the first electric propulsion assembly and the second electric propulsion assembly are disposed diametrically opposed and equal distant relative to a center of gravity of the aircraft, and wherein the third electric propulsion assembly and the fourth electric propulsion assembly are disposed diametrically opposed and equal distant relative to the center of gravity of the aircraft;
a first power distribution system coupling the first battery with each of the first electric propulsion assembly and the second electric propulsion assembly;
a second power distribution system coupling the second battery with each of the second electric propulsion assembly and the fourth electric propulsion assembly; and
a fuse coupling the first battery with each of the third electric propulsion assembly and the fourth electric propulsion assembly and the second battery with each of the first electric propulsion assembly and the second electric propulsion assembly, wherein the fuse is configured to blow in response to an electrical failure to isolate the first battery from each of the third electric propulsion assembly and the fourth electric propulsion assembly and isolate the second battery from each of the first electric propulsion assembly and the second electric propulsion assembly.

6. The electrically powered aircraft of claim 5, wherein the first electric propulsion assembly is attached to a left wing of the aircraft and the second electric propulsion assembly is attached to a right wing of the aircraft.

7. The electrically powered aircraft of claim 6, wherein the third electric propulsion assembly is attached to the left wing of the aircraft and the fourth electric propulsion assembly is attached to the right wing of the aircraft.

8. The electrically powered aircraft of claim 5, wherein at least one of:
the first electric propulsion assembly comprises a first electric propulsion assembly propeller, a first electric propulsion assembly shaft configured for rotating the first electric propulsion assembly propeller, a first electric propulsion assembly primary winding configured for rotating the first electric propulsion assembly shaft, a first electric propulsion assembly primary controller configured for controlling delivery of electrical current from the first battery to the first electric propulsion assembly primary winding, a first electric propulsion assembly redundant winding configured for rotating the first electric propulsion assembly shaft, a first electric propulsion assembly redundant controller configured for controlling delivery of electrical current to the first electric propulsion assembly redundant winding from one of the plurality of batteries other than the first battery;
the second electric propulsion assembly comprises a second electric propulsion assembly propeller, a second electric propulsion assembly shaft configured for rotating the second electric propulsion assembly propeller, a second electric propulsion assembly primary winding configured for rotating the second electric propulsion assembly shaft, a second electric propulsion assembly primary controller configured for controlling delivery of electrical current from the first battery to the second electric propulsion assembly primary winding, a second electric propulsion assembly redundant winding configured for rotating the second electric propulsion assembly shaft, a second electric propulsion assembly redundant controller configured for controlling delivery of electrical current to the second electric propulsion assembly redundant winding from one of the plurality of batteries other than the first battery;
the third electric propulsion assembly comprises a third electric propulsion assembly propeller, a third electric propulsion assembly shaft configured for rotating the third electric propulsion assembly propeller, a third electric propulsion assembly primary winding configured for rotating the third electric propulsion assembly shaft, a third electric propulsion assembly primary controller configured for controlling delivery of electrical current from the second battery to the third electric propulsion assembly primary winding, a third electric propulsion assembly redundant winding configured for rotating the third electric propulsion assembly shaft, a third electric propulsion assembly redundant controller configured for controlling delivery of electrical current to the third electric propulsion assembly redundant winding from one of the plurality of batteries other than the second battery; or
the fourth electric propulsion assembly comprises a fourth electric propulsion assembly propeller, a fourth electric propulsion assembly shaft configured for rotating the fourth electric propulsion assembly propeller, a fourth electric propulsion assembly primary winding configured for rotating the fourth electric propulsion assembly shaft, a fourth electric propulsion assembly primary controller configured for controlling delivery of electrical current from the second battery to the fourth electric propulsion assembly primary winding, a fourth electric propulsion assembly redundant winding configured for rotating the fourth electric propulsion assembly shaft, a fourth electric propulsion assembly redundant controller configured for controlling delivery of electrical current to the fourth electric propulsion assembly redundant winding from one of the plurality of batteries other than the second battery.

9. The electrically powered aircraft of claim 8, wherein at least one of:
the first electric propulsion assembly redundant controller is configured for controlling delivery of electrical current to the first electric propulsion assembly redundant winding from the second battery;
the second electric propulsion assembly redundant controller is configured for controlling delivery of electrical current to the second electric propulsion assembly redundant winding from the second battery;
the third electric propulsion assembly redundant controller is configured for controlling delivery of electrical current to the third electric propulsion assembly redundant winding from the first battery; or
the fourth electric propulsion assembly redundant controller is configured for controlling delivery of electrical current to the fourth electric propulsion assembly redundant winding from the first battery.

10. A method of powering an aircraft comprising:
supplying electrical power to a primary winding of a first electric propulsion assembly and a primary winding of a second electric propulsion assembly from a first battery via a first isolated power distribution circuit, wherein the first electric propulsion assembly is attached to a left wing of the aircraft and the second electric propulsion assembly is attached to a right wing of the aircraft, wherein the first electric propulsion assembly and the second electric propulsion assembly are disposed diametrically opposed and equal distant relative to a center of gravity of the aircraft, and wherein the first isolated power distribution circuit isolates the first battery from a primary winding of a third electric propulsion assembly and a primary winding of a fourth electric propulsion assembly; and supplying electrical power to the primary winding of the third electric propulsion assembly and the primary winding of the fourth electric propulsion assembly from a second battery via a second isolated power distribution circuit, wherein the third electric propulsion assembly is attached to the left wing of the aircraft and the fourth electric propulsion assembly is attached to the right wing of the aircraft, wherein the third electric propulsion assembly and the fourth electric propulsion assembly are disposed diametrically opposed and equal distant relative to the center of gravity of the aircraft, and wherein the second isolated power distribution circuit isolates the second battery from the primary winding of the first electric propulsion assembly and the primary winding of the second electric propulsion assembly.

11. The method of claim 10, further comprising:
supplying electrical power to a redundant winding of the first electric propulsion assembly and a redundant winding of the second electric propulsion assembly from a third battery via a first redundant isolated power distribution circuit coupled to the third battery; and supplying electrical power to a redundant winding of the third electric propulsion assembly and a redundant winding of the fourth electric propulsion assembly from a fourth battery via a second redundant isolated power distribution circuit coupled to the fourth battery.

12. The method of claim 10, wherein:
the first isolated power distribution circuit comprises a first contactor coupled between the first battery and the first electric propulsion assembly and between the first battery and the second electric propulsion assembly; and the second isolated power distribution circuit comprises a second contactor coupled between the second battery and the third electric propulsion assembly and between the second battery and the fourth electric propulsion assembly.

13. The method of claim 10, further comprising:
supplying electrical power to a redundant winding of the first electric propulsion assembly and a redundant winding of the second electric propulsion assembly from the second battery via a first redundant isolated power distribution circuit coupled to the second battery; and supplying electrical power to a redundant winding of the third electric propulsion assembly and a redundant winding of the fourth electric propulsion assembly from the first battery via a second redundant isolated power distribution circuit coupled to the first battery.

\* \* \* \* \*